UNITED STATES PATENT OFFICE.

J. W. BARKER AND J. P. HASKIN, OF SYRACUSE, NEW YORK.

IMPROVEMENT IN THE PURIFICATION OF COMMON SALT.

Specification forming part of Letters Patent No. 33,424, dated October 8, 1861.

*To all whom it may concern:*

Be it known that we, JOHN W. BARKER and JAMES P. HASKIN, of the city of Syracuse, in the county of Onondaga, in the State of New York, have invented a new and Improved Mode of Removing Impurities from Manufactured Salt; and we do hereby declare that the following is a full and exact description thereof and of the mode adopted by us for the removal of the impurities found in almost all varieties of common salt.

It is known that nearly all varieties of common salt contain the chloride of magnesium or calcium, or both of these chlorides, in hurtful degrees, and that they are removed with great difficulty and imperfectly in any mode heretofore adopted for that purpose.

In our process we take the common salt to be purified, place it in a vat or vessel prepared for the purpose, and wash or rinse the salt thoroughly in a saturated brine, in which we dissolve an amount of carbonate or bicarbonate of potash or soda chemically equivalent to the ascertained or estimated quantities of chloride of calcium and chloride of magnesium contained in the salt. In this way the chlorides of calcium and magnesium are entirely decomposed, and there results chloride of sodium or common salt and carbonates of lime and magnesia. The chloride of sodium produced remains with the salt operated on, while the carbonates of lime and magnesia are found in suspension in the brine in minute particles, and are held in suspension by agitating the brine, while the washed or purified salt is removed.

We do not claim the mode of removing impurities by chemical agents from brine from which salt is to be made, for this, we suppose, is the common property of all. Neither do we claim the right to decompose the impurities by adding carbonate or bicarbonate of potash or soda to manufactured and dry salt, this right being already granted to another.

We believe our process to be superior to the process first above disclaimed in point of economy, and to that last above disclaimed in the economy of labor and in the more perfect separation of the resulting chlorides of lime and magnesia from the salt.

What we do claim as our invention or improvement is—

The mode of decomposing the impurities in manufactured salt by immersing or washing it in a solution of the carbonate or bicarbonate of potash or soda in saturated brine, as above set forth, through which means the chemical results stated are produced.

Dated September 14, 1861.

JOHN W. BARKER.
JAMES P. HASKIN.

Witnesses:
JAMES S. LEACH,
Z. CHAS. FOOT.